Sept. 13, 1938.  H. C. ECKRICH ET AL  2,129,832
MEAT PACKAGE
Filed Aug. 18, 1937
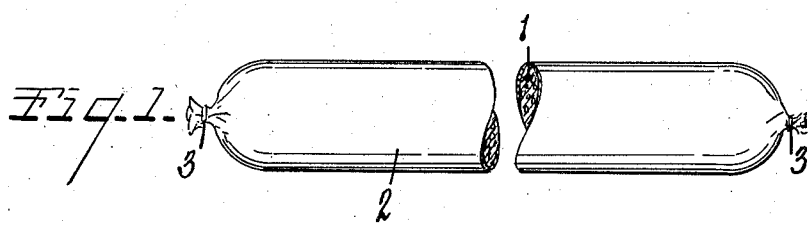
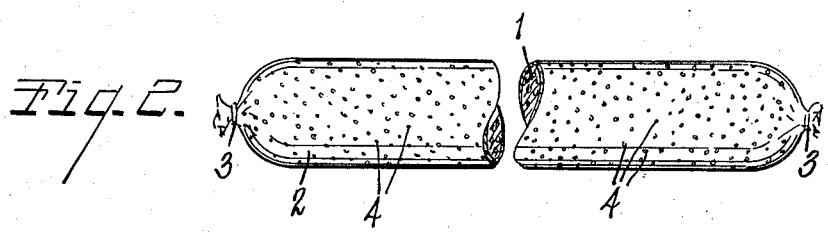
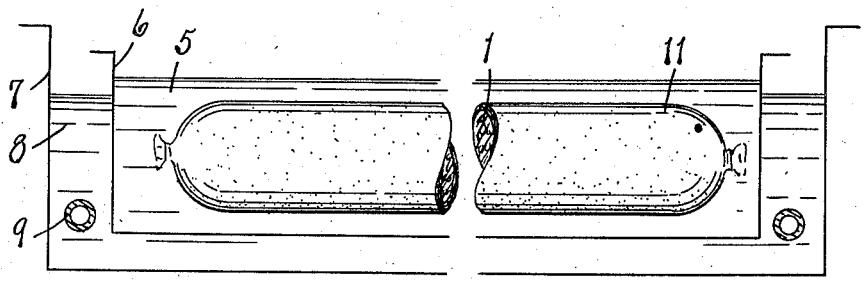
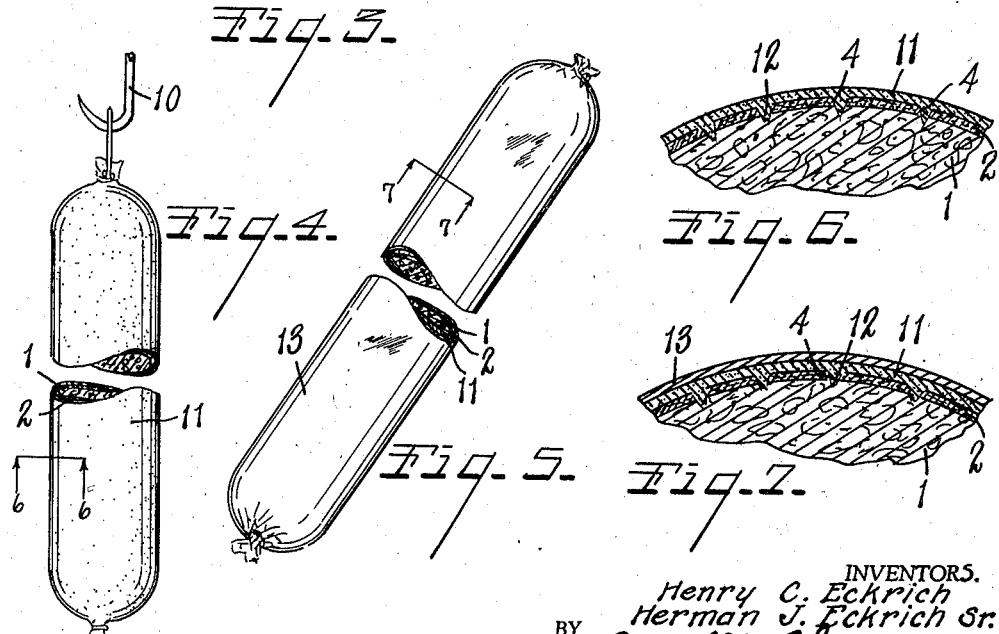
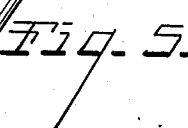
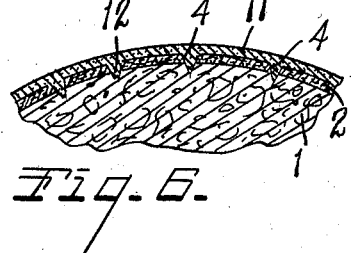
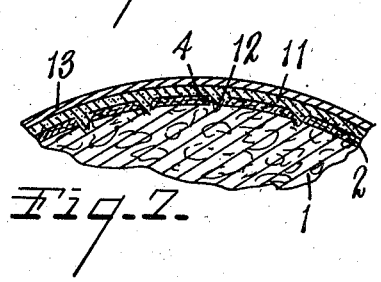
INVENTORS.
Henry C. Eckrich
Herman J. Eckrich Sr.
BY Earl & Chappell
ATTORNEYS Patented Sept. 13, 1938

2,129,832

UNITED STATES PATENT OFFICE 2,129,832

MEAT PACKAGE

Henry Carl Eckrich and Herman J. Eckrich, Sr., Fort Wayne, Ind., assignors to Peter Eckrich & Sons, Inc., Kalamazoo, Mich., a corporation of Indiana Application August 18, 1937, Serial No. 159,668

10 Claims. (Cl. 99—176)

The main objects of this invention are:

First, to provide a casing for meat products which is highly efficient in the protection of the product and is effective for such protection over a long period of time and under varying weather conditions.

Second, to produce an improved meat package.

Third, to provide a casing for meat and other food products which is economical both in the matter of materials used and in applying to the product.

Further objects pertaining to details and economies of the invention will definitely appear from the description to follow. The invention is pointed out in the claims.

Our invention is clearly illustrated in the accompanying drawing, in which:

Fig. 1 is a fragmentary side view of a meat package embodying our invention illustrating the first step in applying the casing.

Fig. 2 is a fragmentary side view illustrating one of the steps in the production of the package.

Fig. 3 is a view largely diagrammatic illustrating the dipping or coating step.

Fig. 4 is a fragmentary view illustrating the dipping step following the coating.

Fig. 5 is a fragmentary view of the completed package.

Fig. 6 is an enlarged detail section on line 6—6 of Fig. 4.

Fig. 7 is an enlarged detail section on line 7—7 of Fig. 5.

In the marketing of meat products such as liver sausage, liver loaf and other meat loaves or meat products, it is essential to provide an effective protecting coating. Animal fats have been used for that purpose but there are various objections and difficulties in using such materials owing to the instability of the fats and tendency toward rancidity.

In our application for patent, Serial No. 159,709, filed August 18, 1937, we have described our improved fat substitute and method of making it in detail. This fat substitute or meat dip, as it is commercially designated by us, comprises a homogeneous combination of gelatin and a fat or fatty material such for instance as lard, cocoanut oil, vegetable oils or other oils or fats, particularly those which are solid at normal atmospheric temperatures.

These materials are combined to produce a homogeneous substance having a consistency closely approaching that of the white of a boiled egg. As set forth and claimed in our said copending application, gelatin is dissolved or combined with water and violently agitated to a frothy condition, then the melted fatty material is added and the mixture agitated to homogeneity.

We preferably use about 3 pounds of water to 1 pound of dry gelatin, and 3 pounds of the fatty material to 4 pounds of the liquid or dissolved gelatin.

A typical procedure in producing the aforesaid fat substitute or meat dip is as follows:

To 100 pounds of cold water we add 30 pounds of powdered dry gelatin. Preferably the water is stirred while the gelatin is added. The water and gelatin mixture is then heated to approximately 180 to 190 degrees by placing the container in a vat of water at that temperature and this is maintained until all of the gelatin has been dissolved. The liquid gelatin is then placed in a beater or agitator which is operated at high speed for about two minutes, which produces a frothy condition in the gelatin. While in this condition and while continuing to agitate the gelatin, we gradually add or pour into the container melted lard, cocoanut oil, vegetable oil, or any oil or fat which will solidify when cold, in the proportions of about 3 pounds of fatty material to 4 pounds of the liquid gelatin. The fatty material is preferably at about 160 degrees when poured into the gelatin.

After the fatty material has been poured into the gelatin, the beating or agitation is continued for approximately two minutes, which ordinarily results in a homogeneous mixture. The mixture may then be placed in a container for storage and preferably cooled in a refrigerator at from 35 to 40 degrees. The temperatures indicated are Fahrenheit.

When cooled, the product has the consistency approximating that of the white of a boiled egg, that is, an egg which has been boiled until the white is past the fluid or flowing state. The product is somewhat resilient, and where lard, for instance, is used, the product is white. Certain fatty materials might result in a modification or change of color.

In forming the coating or package the meat body, such for example as liver sausage, is stuffed into a fibrous casing of suitable character such as the casings made by the Visking Corporation. In the accompanying drawing 1 represents the meat body and 2 such an inner casing. This inner casing is tied at the ends as indicated at 3 which is usual practice. After applying the casing 2 is perforated as indicated at 4 in Fig. 2. This also is old practice in meat processing. The product in the perforated casing is then dipped in our coating material which is conventionally shown at 5 in a suitable tank or container 6 supported within a heating tank 7 having water 8 therein and heating coils indicated at 9. This enables maintaining the dipping material at a suitable temperature. Ordinarily one dipping is all that is required but if a thicker coating is desired the dipping step may be repeated.

After the dipping step the product is ordinarily suspended as indicated at Fig. 4, the suspending means being conventionally shown at 10.

This dipping results in a complete continuous coating 11, see Fig. 6, the coating material having portions 12 entering the perforations 4 and serving as a means for effectively binding the coating to the inner liner 2.

After the coating 11 has completely solidified, which may be hastened by placing in a refrigerator, although it solidifies quite quickly in any event as the temperature of the material when dipping is only such as to liquefy it or reduce it to dipping consistency, the product is stuffed into an outer casing 13 of cellulose material or preferably a transparent material, and it is ready for storage or the market.

While the coating is not intended as a food it is wholesome and edible, and should any fragments thereof become attached to the food through the openings 4 it is not noticeable or objectionable.

We have illustrated and described our invention in an embodiment which we have found very practical. We have not attempted to illustrate or describe various adaptations or to indicate the various foods and products to which the coating may be applied as we believe this disclosure will enable those skilled in the art to embody or adapt our invention as may be desired.

Having thus described our invention what we claim as new and desire to secure by Letters Patent is:

1. A meat package comprising a body of meat, and a casing therefor comprising a fibrous liner encasing the body of meat and having a plurality of holes therein, a continuous intermediate dip sealing coating for the fibrous casing comprising lard and gelatin homogeneously combined and having a consistency approximating that of the white of a boiled egg, and an outer covering of cellulose material closely fitting the intermediate coating, said coating extending into said holes to bind the casing and coating together.

2. A meat package comprising a body of meat, and a casing therefor comprising a fibrous liner encasing the body of meat and having a plurality of holes therein, and a continuous intermediate dip sealing coating for the fibrous casing comprising lard and gelatin homogeneously combined and solidifying at atmospheric temperatures, said coating extending into said holes to bind the casing and coating together.

3. A meat package comprising a body of meat, and a casing therefor comprising a fibrous liner encasing the body of meat and having a plurality of holes therein, a continuous intermediate dip sealing coating for the fibrous casing comprising a fat which will solidify at atmospheric temperatures and gelatin homogeneously combined and having a consistency approximating that of the white of a boiled egg, and an outer protecting covering closely fitting the intermediate coating.

4. A meat package comprising a body of meat, and a casing therefor comprising a fibrous liner encasing the body of meat and having a plurality of holes therein, a continuous intermediate dip sealing coating for the fibrous casing comprising a fat which will solidify at atmospheric temperatures and gelatin homogeneously combined, an outer protecting covering closely fitting the intermediate coating.

5. A casing for meat products comprising a fibrous liner having a plurality of holes therein, a continuous intermediate dip sealing coating for the fibrous liner comprising water, gelatin and lard homogeneously mixed and having a consistency approximately that of the white of a boiled egg, and an outer covering of cellulose material closely fitting the intermediate coating.

6. A casing for meat products comprising a perforated liner, a continuous intermediate dip sealing coating for the fibrous liner comprising water, gelatin and lard homogeneously mixed and having a consistency approximately that of the white of a boiled egg, and an outer protective covering.

7. A casing for meat products comprising a perforated liner, a continuous intermediate dip sealing coating for the fibrous liner comprising water, gelatin and lard in the proportion of about 4 pounds of the combined water and gelatin to 3 pounds of lard homogeneously mixed and having a consistency approximately that of the white of a boiled egg, and an outer protective covering.

8. A casing for meat products comprising a perforated fibrous liner, a continuous intermediate dip sealing coating for the fibrous casing comprising water, gelatin and an edible fatty material which is solid at atmospheric temperature in the proportion of about 4 pounds of the combined water and gelatin to 3 pounds of fatty material homogeneously mixed, and an outer covering.

9. A casing for meat products comprising a fibrous liner having a plurality of holes therein, a continuous intermediate dip sealing coating for the fibrous casing comprising water, gelatin and an edible fatty material which is solid at atmospheric temperature homogeneously mixed and having a consistency approximately that of the white of a boiled egg, and an outer covering of cellulose material closely fitting the intermediate coating.

10. A casing for meat products comprising a perforated liner, a continuous intermediate dip sealing coating for the fibrous casing comprising water, gelatin and an edible fatty material which is solid at atmospheric temperature homogeneously mixed and having a consistency approximately that of the white of a boiled egg, and an outer covering.

HENRY CARL ECKRICH.
HERMAN J. ECKRICH, Sr.